United States Patent
Chambon

(10) Patent No.: US 10,505,367 B2
(45) Date of Patent: Dec. 10, 2019

(54) APPARATUS AND METHOD FOR PROVIDING A POWER INTERFACE

(71) Applicant: SCHNEIDER ELECTRIC IT CORPORATION, West Kingston, RI (US)

(72) Inventor: Patrick Chambon, Saint Martin d'hères (FR)

(73) Assignee: SCHNEIDER ELECTRIC IT CORPORATION, West Kingston, RI (US)

( * ) Notice: Subject to any disclaimer, the term of this patent is extended or adjusted under 35 U.S.C. 154(b) by 352 days.

(21) Appl. No.: 14/913,066

(22) PCT Filed: Aug. 21, 2013

(86) PCT No.: PCT/US2013/056051
§ 371 (c)(1),
(2) Date: Feb. 19, 2016

(87) PCT Pub. No.: WO2015/026343
PCT Pub. Date: Feb. 26, 2015

(65) Prior Publication Data
US 2016/0204611 A1    Jul. 14, 2016

(51) Int. Cl.
*H02J 3/00* (2006.01)
*H02J 3/34* (2006.01)
(Continued)

(52) U.S. Cl.
CPC .............. *H02J 3/34* (2013.01); *H02J 3/1835* (2013.01); *H02J 3/381* (2013.01); *H02J 3/382* (2013.01);
(Continued)

(58) Field of Classification Search
CPC .... H02J 3/1835; H02J 3/32; H02J 3/34; H02J 3/381; H02J 3/382; H02J 3/383;
(Continued)

(56) References Cited

U.S. PATENT DOCUMENTS 4,780,660 A * 10/1988 Shima ................. G01R 19/06
                                                                  323/205
5,083,039 A *  1/1992 Richardson ........... F03D 7/0272
                                                                   290/44
(Continued)

FOREIGN PATENT DOCUMENTS

CN           102237826 A     11/2011
WO         2006094128 A2      9/2006

OTHER PUBLICATIONS

Notification of Transmittal of the International Search Report and the Written Opinion of the International Searching Authority from corresponding PCT/US2013/056051 dated Mar. 18, 2014.
(Continued)

Primary Examiner — Jared Fureman
Assistant Examiner — Esayas G Yeshaw
(74) Attorney, Agent, or Firm — Lando & Anastasi, LLP

(57) ABSTRACT

Aspects and embodiments described herein are directed toward a power interface device including a first power interface configured to couple to an electric utility and a second power interface configured to couple to a microgrid comprising one or more power sources and one or more loads, the one or more power sources including a generator. The power interface device also includes a power conversion circuit coupled to the first power interface and the second power interface and a controller coupled to the power conversion circuit. The controller is configured to allow interfacing between the electric utility operating at a first frequency and voltage and the microgrid operating at a second frequency and voltage by at least detecting an
(Continued)

operating frequency of the generator and controlling a power flow between the electric utility and the microgrid based on the operating frequency of the generator.

19 Claims, 10 Drawing Sheets

(51) Int. Cl.
| | | |
|---|---|---|
| *H02J 3/18* | (2006.01) | |
| *H02J 3/38* | (2006.01) | |
| *H02J 3/48* | (2006.01) | |
| *H02J 3/32* | (2006.01) | |
| *H02J 7/34* | (2006.01) | |
| *H02J 7/35* | (2006.01) | |

(52) U.S. Cl.
CPC . *H02J 3/48* (2013.01); *H02J 3/32* (2013.01); *H02J 3/383* (2013.01); *H02J 3/386* (2013.01); *H02J 7/34* (2013.01); *H02J 7/35* (2013.01); *Y02E 10/563* (2013.01); *Y02E 10/566* (2013.01); *Y02E 10/763* (2013.01); *Y02E 10/766* (2013.01); *Y02E 40/30* (2013.01); *Y02P 90/50* (2015.11)

(58) Field of Classification Search
CPC ...... H02J 3/386; H02J 3/48; H02J 7/34; H02J 7/35; Y02E 10/563; Y02E 10/566; Y02E 10/763; Y02E 10/766; Y02E 40/30; Y02P 90/50

See application file for complete search history.

(56) References Cited

U.S. PATENT DOCUMENTS

| | | | |
|---|---|---|---|
| 9,502,904 B2 | 11/2016 | Bhavaraju et al. | |
| 2003/0163296 A1* | 8/2003 | Richards | G06F 17/5036 703/14 |
| 2004/0084965 A1 | 5/2004 | Welches et al. | |
| 2008/0278005 A1 | 11/2008 | Chambon | |
| 2009/0189456 A1* | 7/2009 | Skutt | B60L 11/1842 307/87 |
| 2010/0198421 A1 | 8/2010 | Fahimi et al. | |
| 2011/0273022 A1 | 11/2011 | Dennis et al. | |
| 2012/0150679 A1* | 6/2012 | Lazaris | G06Q 30/0605 705/26.2 |
| 2012/0205912 A1 | 8/2012 | Wakasa et al. | |
| 2012/0215368 A1 | 8/2012 | Sharma | |
| 2013/0015703 A1 | 1/2013 | Rouse et al. | |
| 2013/0049471 A1 | 2/2013 | Oleynik et al. | |
| 2013/0079943 A1 | 3/2013 | Darden, II et al. | |
| 2013/0082530 A1* | 4/2013 | Li | H02J 3/383 307/64 |
| 2013/0127164 A1* | 5/2013 | Pena | F02C 1/00 290/2 |
| 2014/0018969 A1 | 1/2014 | Forbes, Jr. | |
| 2014/0200722 A1* | 7/2014 | Bhavaraju | H02J 3/381 700/286 |
| 2015/0083393 A1* | 3/2015 | Ferrari | H02J 3/383 166/105 |
| 2016/0043555 A1* | 2/2016 | Howell | G06F 1/263 307/23 |
| 2016/0306372 A1* | 10/2016 | Holveck | G05F 1/625 |

OTHER PUBLICATIONS

Extended European Search Report from corresponding European Application No. 13891913.9 dated May 24, 2017.
Lasseter, R. H. Ed—Institute of Electrical and Electronics Engineers: "MicroGrids", 2002 IEEE Power Engineering Society, Winter Meeting, Conference Proceedings, New York, NY, Jan. 27-31, 2002; [IEEE Power Engineering Society], New York, NY: IEEE, US, vol. 1, Jan. 27, 2002 (Jan. 27, 2002), pp. 305-308, XP010578286, DOI: 10.1109/PESW.2002.985003, ISBN: 978-0-7803-7322-8.
Leonhard, W: "Electrical engineering between energy and information", Power Electronics and Motion Control Conference, 2000, Proceedings, PI EMC 2000, The Third International Aug. 15-18, 2000, Piscataway, NJ, USA, IEEE, vol. 1, Aug. 15, 2000 (Aug. 15, 2000), pp. 197-202, XP010522842, ISBN: 978-7-80003-464-0.
Australian Examination Report No. 2 from corresponding Australian Application No. 2013398322 dated Dec. 14, 2017.
Enrique Lopez P. et al: "Control and Planning of 50/60 HZ Industrial System Load FLows", Proceedings of the Colloquium in South America, Argentina, Brazil, Chile, Uruguay, Aug. 31-Sep. 15, 1990; [Proceedings of the Colloquium in South America], New York, IEEE, US, vol. -, Aug. 31, 1990 (Aug. 31, 1990), pp. 162-167 XP000236091.

* cited by examiner

APPARATUS AND METHOD FOR PROVIDING A POWER INTERFACE

CROSS-REFERENCE TO RELATED APPLICATIONS

This application is a U.S. National Stage Application under 35 U.S.C. § 371 of International Application No. PCT/US2013/056051, filed Aug. 21, 2013, titled APPARATUS AND METHOD FOR PROVIDING A POWER INTERFACE, which is hereby incorporated herein by reference in its entirety.

BACKGROUND

Field of Invention

At least one embodiment of the present invention relates generally to control of a power interface device.

Discussion of Related Art

A microgrid can be a small local grid, which can include one or more various power sources. For example, a microgrid can include a wind generator, a solar generator, a diesel generator, and other power generators. The microgrid can also include loads. For example, the microgrid can include a building, a data center, a harbor, an industrial site, a campus, or even a small town. The microgrid can also be connected to a larger grid, such as a power utility. The utility can provide power to the microgrid, for example, to provide additional power to the loads and/or to improve reliability.

SUMMARY OF THE DISCLOSURE

Aspects and embodiments described herein are directed toward a power interface device including a first power interface configured to couple to an electric utility and a second power interface configured to couple to a microgrid comprising one or more power sources and one or more loads, the one or more power sources including a generator. The power interface device also includes a power conversion circuit coupled to the first power interface and the second power interface and a controller coupled to the power conversion circuit. The controller is configured to allow interfacing between the electric utility operating at a first frequency and voltage and the microgrid operating at a second frequency and voltage by at least detecting an operating frequency of the generator and controlling a power flow between the electric utility and the microgrid based on the operating frequency of the generator.

In some embodiments, the controller is configured to provide power from the electric utility to the microgrid. In some embodiments, the controller is configured to provide power from the electric utility to the microgrid in response to an amount of power demanded by the one or more loads in excess of an amount of power generated by the one or more power sources.

In some embodiments, the controller is configured to provide power from the microgrid to the electric utility. In some embodiments, the controller is configured to provide power from the microgrid to the electric utility in response to an amount of power generated by the one or more power sources and unused by the one or more loads.

In some embodiments, the controller is further configured to determine a reactive current reference to compensate for reactive power generated by the one or more loads.

In some embodiments, the controller is configured to control the power flow between the electric utility and the microgrid independent of instructions from other controllers.

In some embodiments, the power interface device is an uninterruptible power supply. In some embodiments, the power interface device further includes a battery, and the controller is further configured to control a second power flow between the battery and the microgrid.

Aspects are also directed toward a method of distributing power using a power interface device including a first power interface configured to be coupled to an electric utility, a second power interface configured to be coupled to a microgrid, and a power conversion circuit, the method including detecting an operating frequency of the generator and controlling a power flow between the electric utility and the microgrid based on the operating frequency of the generator.

Aspects are also directed toward a power interface device including a first power interface configured to couple to an electric utility, a second power interface configured to couple to a microgrid comprising one or more power sources and one or more loads, the one or more power sources including a generator, a power conversion circuit coupled to the first power interface and the second power interface, and means for detecting an operating frequency of the generator and controlling a power flow between the electric utility and the microgrid based on the operating frequency of the generator.

These and other aspects and embodiments are discussed in detail below. The foregoing information and the following detailed description include illustrative examples of various aspects and embodiments, and provide an overview or framework for understanding the nature and character of the claimed aspects and embodiments. The drawings provide illustration and a further understanding of the various aspects and embodiments, and are incorporated in and constitute a part of this specification. The drawings, together with the remainder of the specification, serve to describe and explain the claimed aspects and embodiments.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
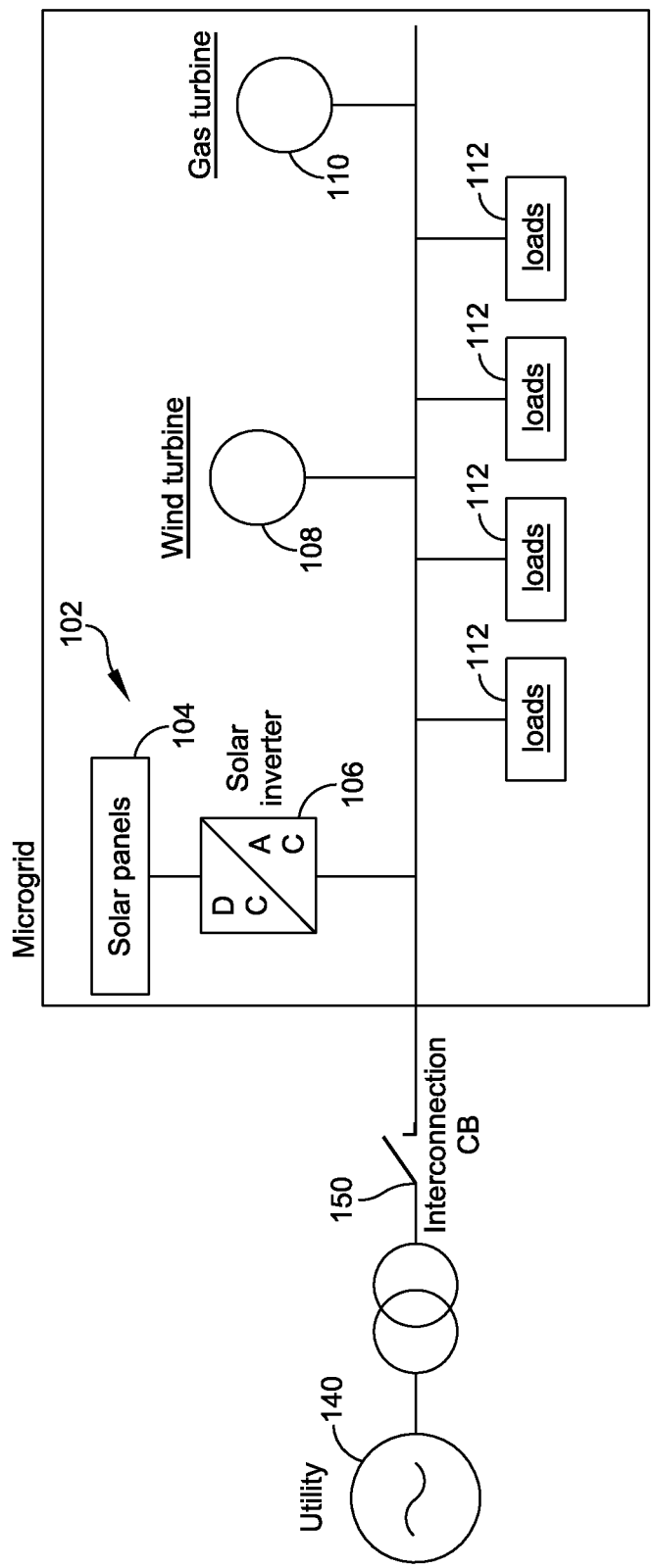
FIG. 1 is a functional block diagram depicting an example microgrid in accordance with the prior art.

A microgrid can include power sources, such as renewable energy sources and other power sources. Renewable energy sources can include power sources such as solar power generators, wind turbines, and other sources of renewable energy. The microgrid can also include power generators such as diesel generators. The microgrid can be coupled to a larger grid, such as an electric utility. A power interface device can provide the interface between the microgrid and the larger grid. The power interface device can allow the microgrid to operate at a frequency and voltage independent of the utility. The power interface device can also regulate voltage and frequency to provide higher quality power from the utility. The power interface device can also compensate for reactive power of the microgrid. In some embodiments, the power interface device can be an uninterruptible power supply (UPS) configured to provide a power interface between the microgrid and a larger grid.

The systems and methods described herein are not limited in their application to the details of construction and the arrangement of components set forth in the description or illustrated in the drawings. The invention is capable of other embodiments and of being practiced or of being carried out in various ways. Also, the phraseology and terminology used herein is for the purpose of description and should not be regarded as limiting. The use of "including" "comprising" "having" "containing" "involving" and variations thereof herein, is meant to encompass the items listed thereafter, equivalents thereof, and additional items, as well as alternate embodiments consisting of the items listed thereafter exclusively.

Various aspects and embodiments are directed to uninterruptible power supplies. In one example, an uninterruptible power supply (UPS) may include an inverter, a controller, and a bypass switch. The controller operates the inverter during online operation to regulate the inverter output voltage and to provide output voltage from the inverter at the UPS output. The controller can also operate the inverter during bypass and other operation modes to provide, among other things, power factor correction, harmonic current distortion control, and active power to charge a backup power source. The controller can time the operation of switches in the inverter to provide output voltage.

FIG. 1 shows an example prior art microgrid 100. The microgrid 100 includes multiple power sources. The power sources can include renewable energy sources, such as a solar generator 102 and a wind turbine 108. The solar generator 102 can include solar panels 104 coupled to a solar inverter 106. The power sources can also include a gas-powered generator 110. The microgrid 100 can also include one or more loads 112. Additionally or alternatively, the microgrid 100 can include power sources and one or more loads can be coupled to the microgrid 100 to receive power from the microgrid 100. The microgrid 100 is connected to a larger grid, including a power utility 140. The microgrid 100 can be connected to the utility 140 via an interconnection 150. The interconnection 150 can be a circuit breaker or other switch.

The microgrid 100 can receive power from the utility 140, such as when power demand from the one or more loads 112 exceeds power provided by the power sources 102, 108, 110. For example, power provided by renewable energy sources, such as the solar generator 102 and the wind turbine 108 can fluctuate depending on factors such as the environment. Solar generators 102 may be able to provide more energy on sunny days relative to cloudy days or during the night. Wind turbines 108 can be dependent on the strength of the wind to provide power. In such instances as when the renewable energy sources are providing less power, power can be drawn from the utility 140 to meet demands of the loads 112.

Further, as there may be fewer loads 112 on the microgrid 100 compared to a larger grid, the amount of power demanded by the loads 112 can vary more widely, as larger grids with more loads can take advantage of averaging effects between the greater number of loads. With a wider variation in aggregate load, regulation of multiple power sources 102, 108, 110 operating in parallel can become complex.

Generally, if the microgrid 100 is connected to the utility 140 by a direct connection, such as the interconnection 150, the microgrid 100 is operated at the same voltage and frequency as the utility 140. When connected to a utility, the microgrid 100 can also be exposed to disturbances in the utility. The interconnection 150 can be opened to disconnect the microgrid 100 from the larger grid and the utility 140. For example, the microgrid 100 can be disconnected from the larger grid when the utility 140 is off or providing low-quality power.

Figure 2:
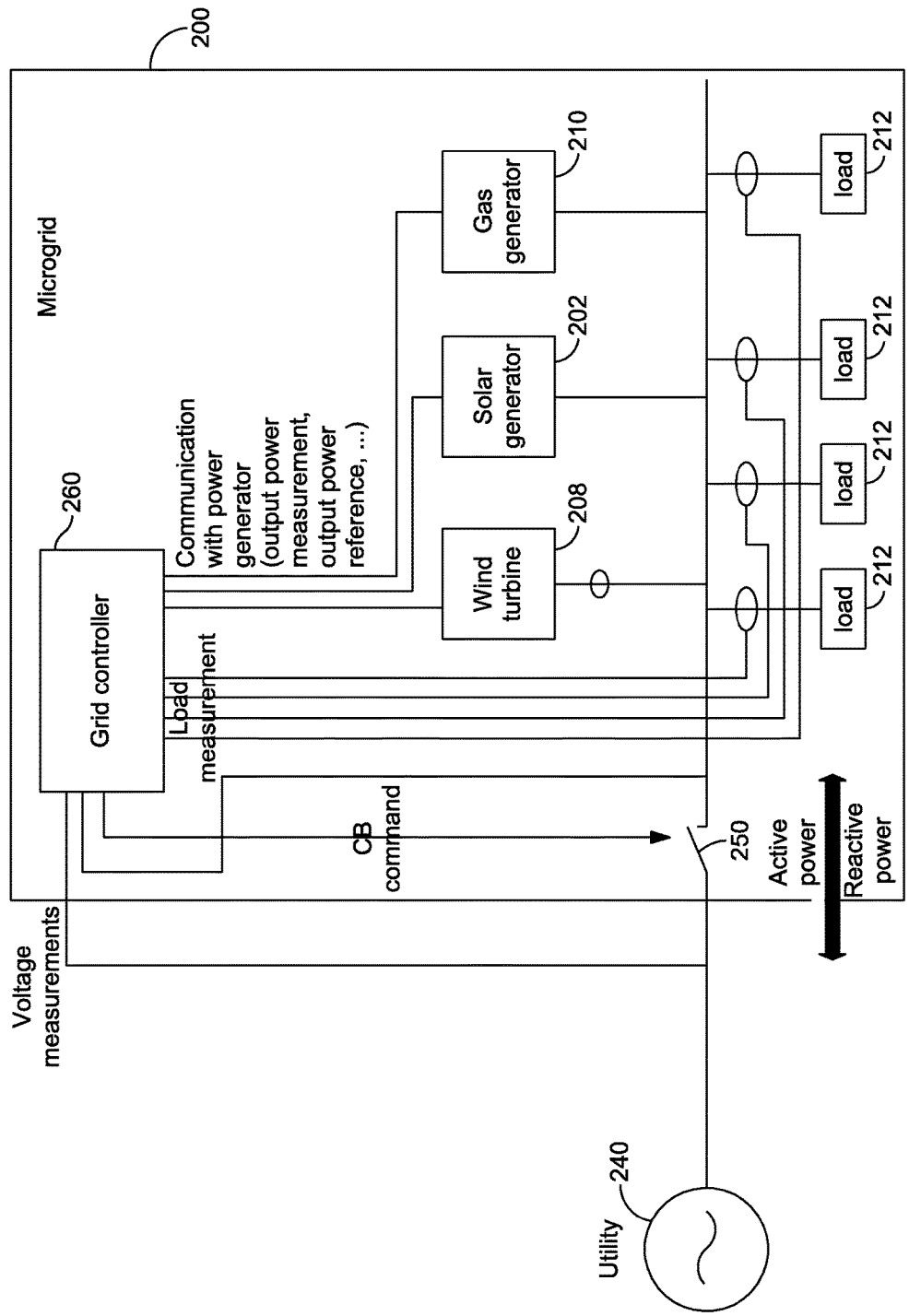
FIG. 2 is a functional block diagram depicting an example microgrid in accordance with the prior art.

Referring to FIG. 2, an example prior art microgrid 200 includes a solar generator 202, a wind turbine 208, and a generator 210. The generator 210 can be, for example, a diesel generator. The microgrid 200 includes one or more loads 212, and is connected to a larger grid including a utility 240 via an interconnection 250. The microgrid 200 also includes a grid controller 260 coupled to each of the power sources 202, 208, 210 and to lines connecting the elements of the microgrid 200 to each other. The grid controller 260 can monitor the power sources 202, 208, 210, the loads 212, and the utility 240 to control the power sources 202, 208, 210 and ensure the loads 212 are receiving adequate power. The grid controller 260 can also determine when the interconnection 250 should be opened and closed.

The grid controller 260 can also be configured to reduce power generated by the generator 210, prioritizing the renewable energy sources such as the solar generator 202 and the wind turbine 208 as preferred sources of power. The grid controller 260 can also be configured to avoid receiving power from the utility 140 unless the generator 210 is at full capacity, as the loads 212 can then be powered by the power sources 202, 208, 210 of the microgrid 200. The grid controller 260 can also be configured to open the interconnection 250 if there is a power outage at the utility 240 or if the power quality from the utility 240 is below a threshold level.

Generally, the microgrid 200 can also be configured to provide power to the larger grid if the power generated by the microgrid 200 exceeds the power demanded by the loads 212. For example, the utility 240 can buy power from the microgrid 200 when the microgrid 200 is generating a power surplus. In some embodiments, the power received by the utility 240 from the microgrid 200 is limited to power generated by renewable energy sources. The grid controller 260 can be configured to avoid providing power from the generator 210 to the utility 240.

The grid controller 260 can be configured to control the microgrid 200 by measuring currents to the loads 212 and voltages of the microgrid 200 and the utility 240. The grid controller 260 can be coupled to lines to each of the loads 212 to measure the load currents. The grid controller 260 can also be coupled to an output line of the utility 240, between the utility 240 and the interconnection 250 as well as an input line of the microgrid 200 between the interconnection 250 and the microgrid 200 to measure the voltages of the utility 240 and the microgrid 200, respectively. The grid controller 260 can also be coupled to the interconnection 250 to provide commands to the interconnection 250 for opening and closing. The grid controller 250 can also be coupled to each of the power sources 202, 208, 210 to receive measurements and provide commands such as output power references.

Figure 3:
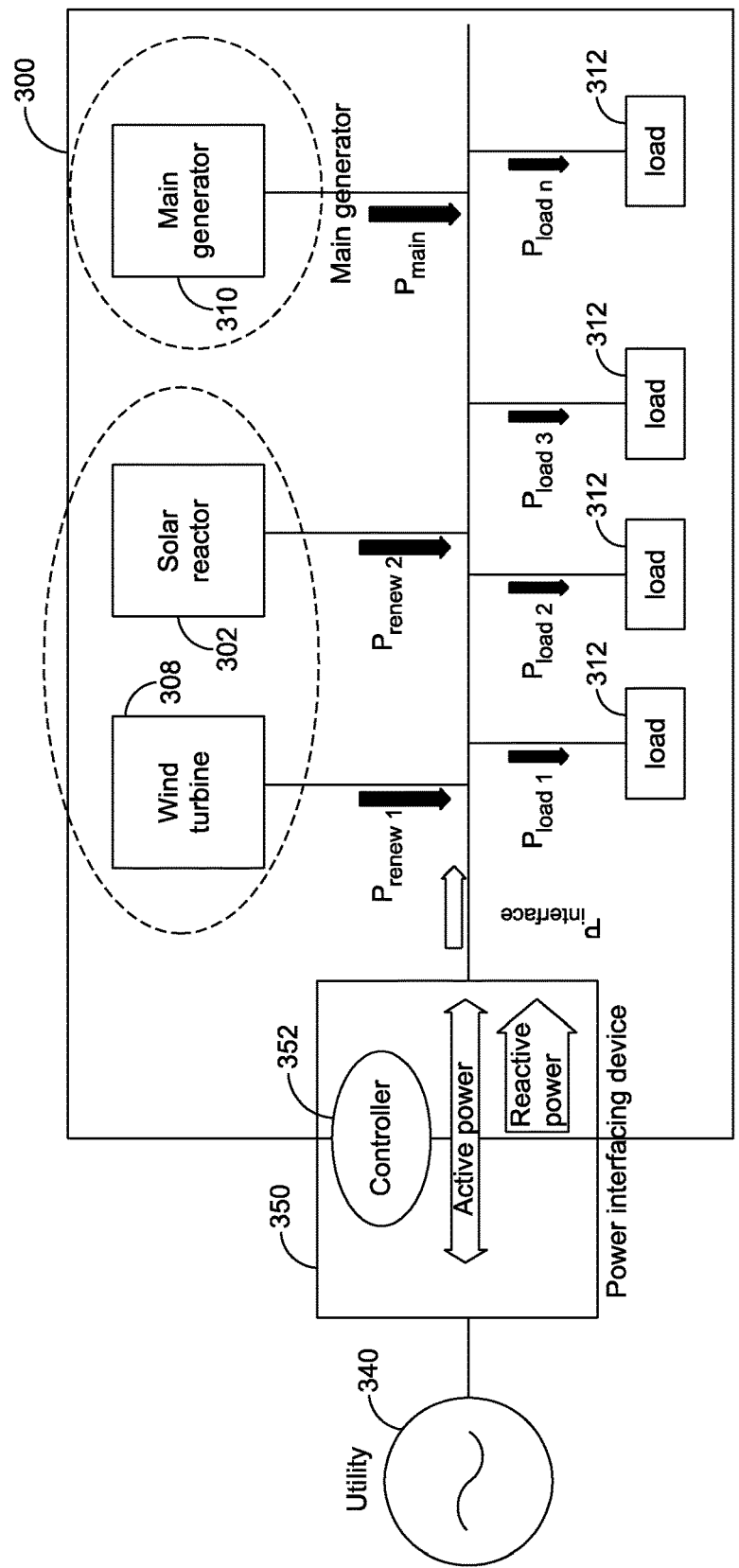
FIG. 3 is a functional block diagram depicting an example microgrid and an example power interface device in accordance with an embodiment.

In some embodiments of the present disclosure, the interconnections 150 and 250 described above can be replaced with a power interface device. FIG. 3 shows a microgrid 300 including renewable energy sources such as a solar generator 302 and a wind turbine 208. The microgrid 300 also includes a main generator 310. The main generator 310 can be, for example, a diesel generator. The microgrid 300 also includes one or more loads 312. The microgrid 300 is connected to a larger grid, including a utility 340 via a power interface device 350. In some embodiments, the power interface device 350 can be an uninterruptible power supply (UPS) such as a reversible UPS.

In some embodiments, the power interface device 350 allows the microgrid 300 to operate at a frequency and voltage different from the utility 340. The power interface device 350 can also regulate voltage and frequency to improve the power quality received from the utility 340 by the microgrid 300. The power interface 350 can also compensate for reactive power of the loads 312 of the microgrid 300. In some embodiments, the power interface device 350 can also include a battery and/or other power storage. The power interface device 350 can also provide power factor correction with a low harmonic current and a low reactive power on the utility side.

The power interface device 350 includes a controller 352. In some embodiments, the main generator 310 operates in droop mode on an output frequency and output voltage amplitude. The other power sources such as the renewable energy sources 302, 308 can operate as current sources. The power interface device 350 can measure the frequency and the voltage of the microgrid 300 and calculate the active power to be exchanged between the larger grid and the microgrid 300. The power interface device 350 can also calculate reactive power to be provided to the microgrid 300.

Figure 4:
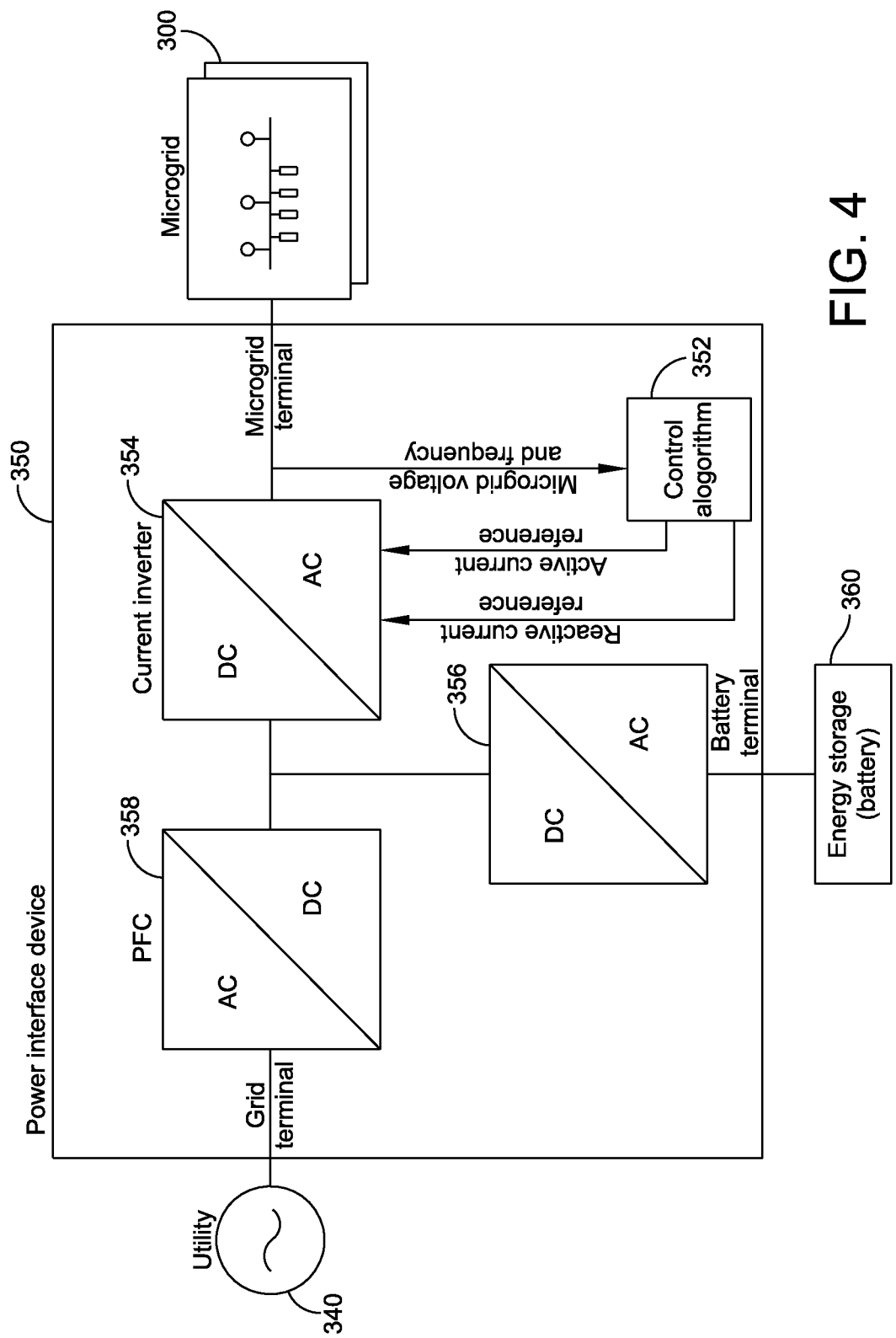
FIG. 4 is a functional block diagram depicting an example power interface device in accordance with an embodiment.

For example, FIG. 4 shows the power interface device 350, connected to the microgrid 300 and the larger grid including a utility 340. The power interface device 350 includes the controller 352, a power factor correction circuit 358, a current inverter 354, a DC/DC converter 356, and a battery 360. In some embodiments, the power interface device 350 is a double-conversion UPS. The power factor correction circuit 358 is coupled to a grid terminal, which is connected to the larger grid. In some embodiments, the power factor correction circuit 358 is an AC/DC power converter. The power factor correction circuit 358 is coupled to the current inverter 354, which is coupled to a microgrid terminal, which connects to the microgrid 300. In some embodiments, the current inverter 354 outputs a sine current with active and reactive components following references provided by a control algorithm implemented by the controller 358.

In some embodiments, the control algorithm calculates the active and reactive power references based on various rules. For example, rules can include generating an output power of a main generator (e.g., the main generator 310 of the microgrid 300 of FIG. 3) that does not exceed a rated power output. The rules can also include generating an output power of the main generator that is not negative. Rules can also include generating a substantially maximal output power from renewable energy sources. The rules can also include generating a main generator output power factor close to 1. Other such rules can be taken into consideration by the control algorithm.

For example, referring again to FIG. 3, the power provided by the power sources 302, 308, 310 and drawn by the loads 312 can be related according to equation 1

$$P_{main} + \Sigma P_{renew} + P_{interface} - \Sigma P_{load} = 0 \quad (1)$$

Figure 5:
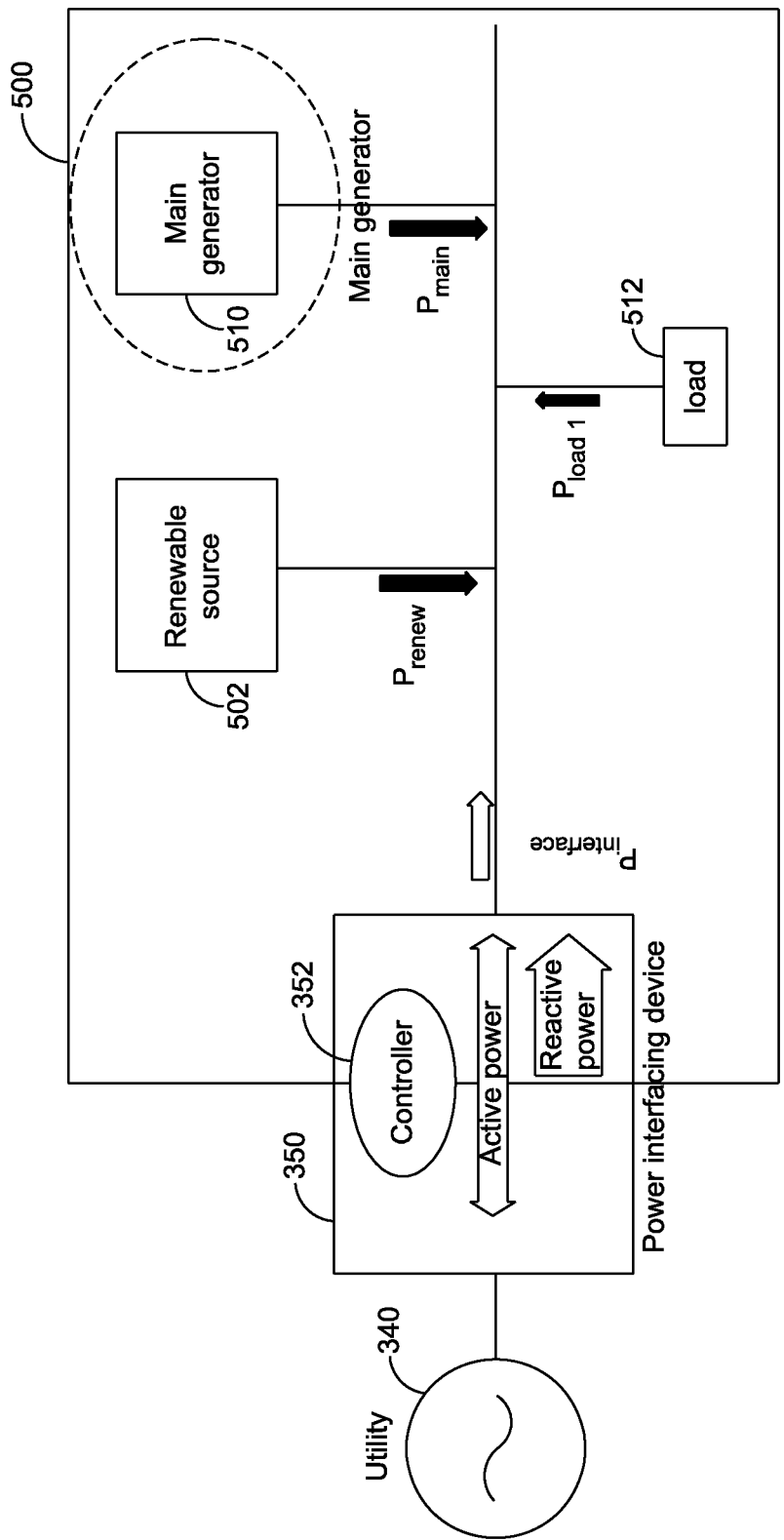
FIG. 5 is a simplified block diagram depicting an example microgrid and an example power interface device in accordance with an embodiment.

The system can also be represented considering one equivalent load and one equivalent renewable energy source, as shown in FIG. 5, which includes a microgrid 500 including a main generator 510, an equivalent renewable energy source 502, an equivalent load 512 connected to the larger grid including the utility 340 via the power interface device 350 including the controller 352. Further, considering only active power, the equation can be simplified as $$Pa_{main} = Pa_{load} - Pa_{renew} - Pa_{interface} \quad (2)$$

In some embodiments, the renewable energy sources are operated to provide maximum capacity. The maximum capacity can be variable depending on environmental factors. If the maximum capacity exceeds the demands from the loads, the surplus can be provided to the larger grid. If the maximum capacity does not meet the demands from the loads, the main generator and the utility can supplement the power provided by the renewable energy sources, as needed. The loads also can vary in power demanded. Thus, $[Pa_{load} - Pa_{renew}]$ can vary as each or both components vary.

If $[Pa_{load} - Pa_{renew}]$ is greater than a maximum rated power output of the main generator 510, the main generator would operate in overload. The power interface device 350 can be configured to automatically provide the power difference from the utility 340 so that the main generator 510 can operate at or near maximum capacity without exceeding the maximum rated capacity. In some embodiments, the power interface device 350 can be configured to maintain other thresholds (e.g., 50% of maximum capacity or allowing maximum rated capacity to be exceeded) for the main generator 510.

If $[Pa_{load} - Pa_{renew}]$ is less than zero, the renewable energy sources 502 are generating more power than demanded by the loads 512. The power interface device 350 can be configured to provide the surplus power to the larger grid or to a battery or other power storage to prevent the main generator 510 from operating in reverse power or stopping due to a reverse power fault.

Figure 6:
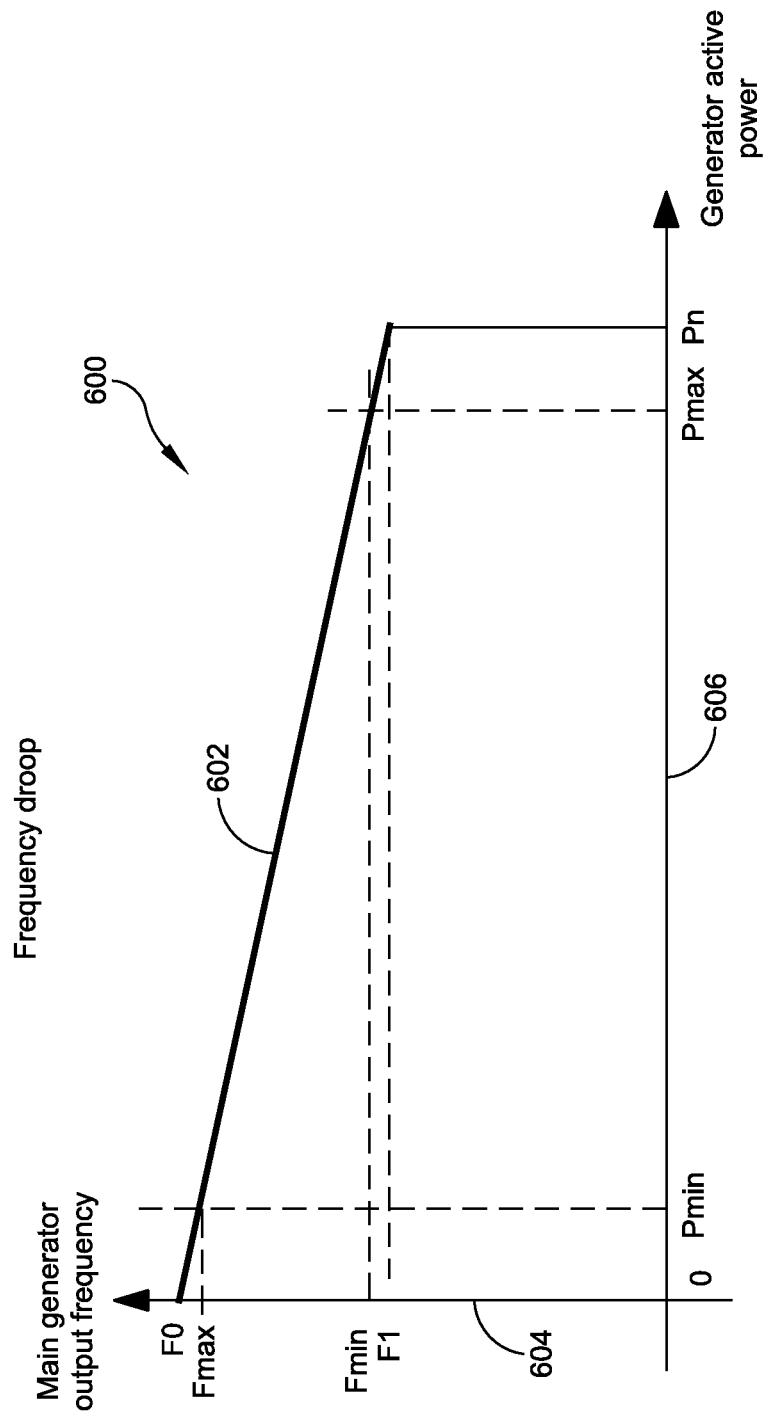
FIG. 6 is a graph depicting frequency droop of a portion of the microgrid in accordance with an embodiment.

In some embodiments, the power interface device 350 can monitor the frequency of the microgrid 300 and use the frequency to monitor the load on the main generator 510. As the main generator 510 runs in a droop mode, the output frequency can provide information pertaining to the output active power of the main generator 510. For example, FIG. 6 shows a graph 600 of an example correlation 602 between the output frequency 604 and the output active power 606 of the main generator 510 running in droop mode. The monitored output frequency 604 can range between values F0 and F1 as the output active power 606 ranges from 0 to a value Pn. The output active power 606 can correspond to the demands of the loads and the supply of the renewable energy sources. For example, the output active power 606 can be a function of $[Pa_{load} - Pa_{renew}]$. The maximum rated power for the main generator 510 can correspond to a frequency, Fmin. When $[Pa_{load} - Pa_{new}]$ is too high, the frequency can drop below Fmin, and the control algorithm can determine that the power interface device 550 should deliver positive active power until the frequency rises above Fmin. A frequency Fmax can correspond to a threshold below which $[Pa_{load} -$ $Pa_{new}$] is too low (e.g., zero). For example, when the load on the main generator 510 is zero or less because the power being supplied by the renewable energy sources meets or exceeds the power demanded, the control algorithm can deliver negative active power until the frequency drops below Fmax.

Figure 7:
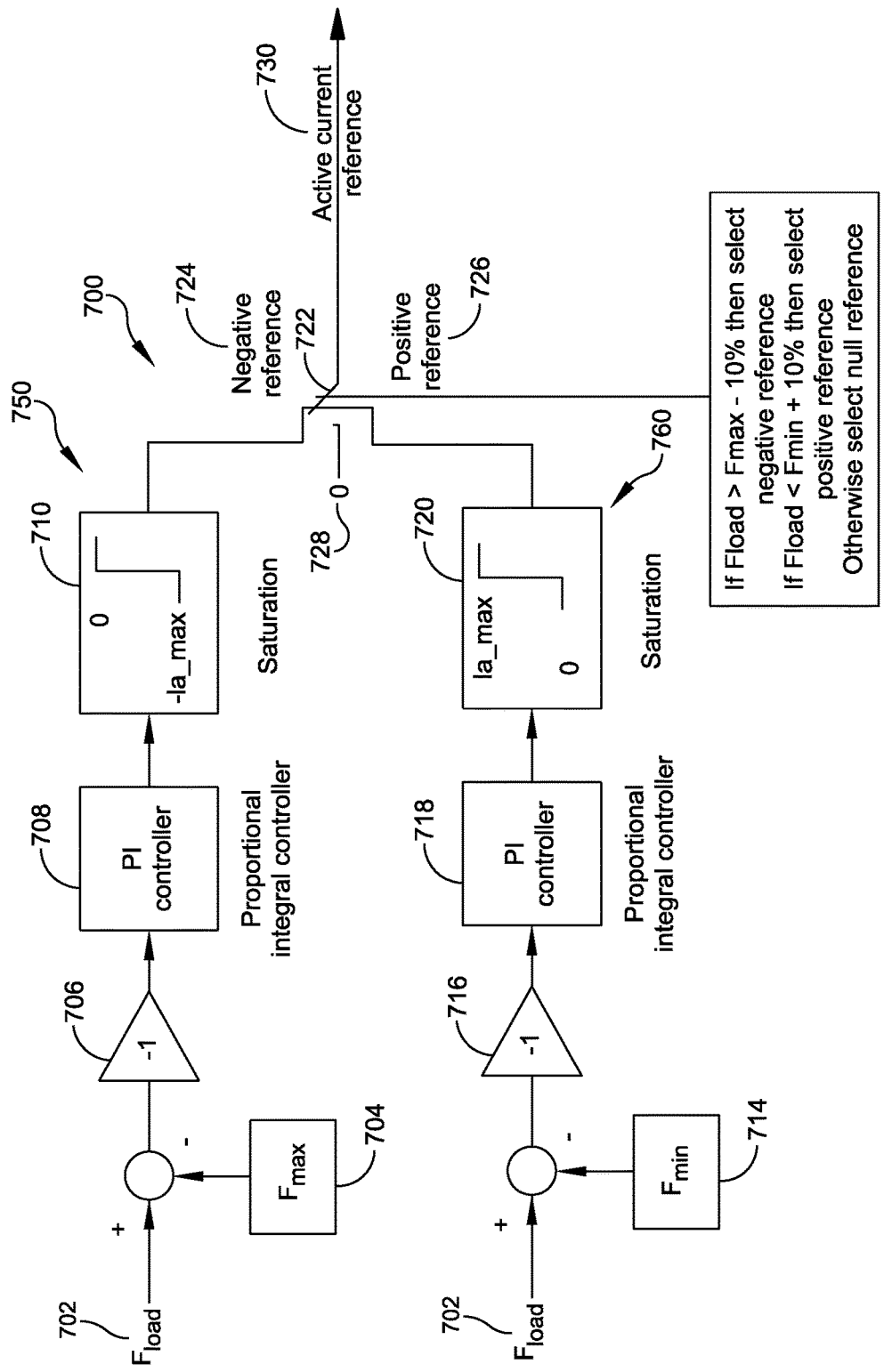
FIG. 7 is a block diagram depicting an example control algorithm in accordance with an embodiment.

FIG. 7 is a block diagram of an example control algorithm 700, which can be implemented, for example, by the controller 552 of the power interface device 550 of FIG. 5. The control algorithm 700 can be composed of two control loops 750, 760 and a selector 722. The first control loop 750 can receive the frequency of the microgrid Road 702. The first control loop 750 can also receive Fmax 704 and subtract Fmax 704 from Fload 702. If Fload 702 is greater than Fmax 704, subtracting Fmax 704 from Fload 702 will result in a positive number. The result can be provided to a negation block 706 which negates the received value. The result from the negation block 706 can be provided to a proportional integral controller 708, followed by a saturation block 710. The saturation block 710 can output 0 or a negative maximum allowed active current, −Ia_max, of the power interface device or any value in between. Thus, the first control loop 750 can output a negative reference current 724 as an active current reference 730 output by the power interface device if the selector 722 is switched to the first control loop 750. The saturation block 710 can allow the output negative reference current 724 to be set to 0 once the load on the main generator returns to a value within a rated operating range of the main generator.

The second control loop 760 can be analogous to the first control loop 750, providing a positive reference current 726 when the Fload 702 is less than a Fmin 714. The second control loop 760 can also receive Road 702 and Fmin 714, subtracting Fmin 714 from Fload 702. The result can be provided to a negation block 716, followed by a proportional integral controller 708, followed by a saturation block 720. The saturation block 720 can output 0 or a positive maximum allowed active current, Ia_max, of the power interface device or any value in between. Thus, the second control loop 760 can output the positive reference current 726 as the active current reference 730 of the power interface device if the selector 722 is switched to the second control loop 722. The selector 722 can determine a position based on an algorithm, such as a comparison between Fload 702, Fmax 704, and Fmin 714. For example, as Road 702 approaches Fmax 704, the selector 722 can be switched to the first control loop 750. For example, the selector 722 can switch to the first control loop 750 if Road 702 is greater than Fmax 704−10% or some other buffer amount. Similarly, the selector 722 can be switched to the second control loop 750 as Fload 702 approaches Fmin 714, such as if it is less than Fmin 714+10%. If neither condition is true, the selector 722 can be set to a null reference setting.

Figure 8:
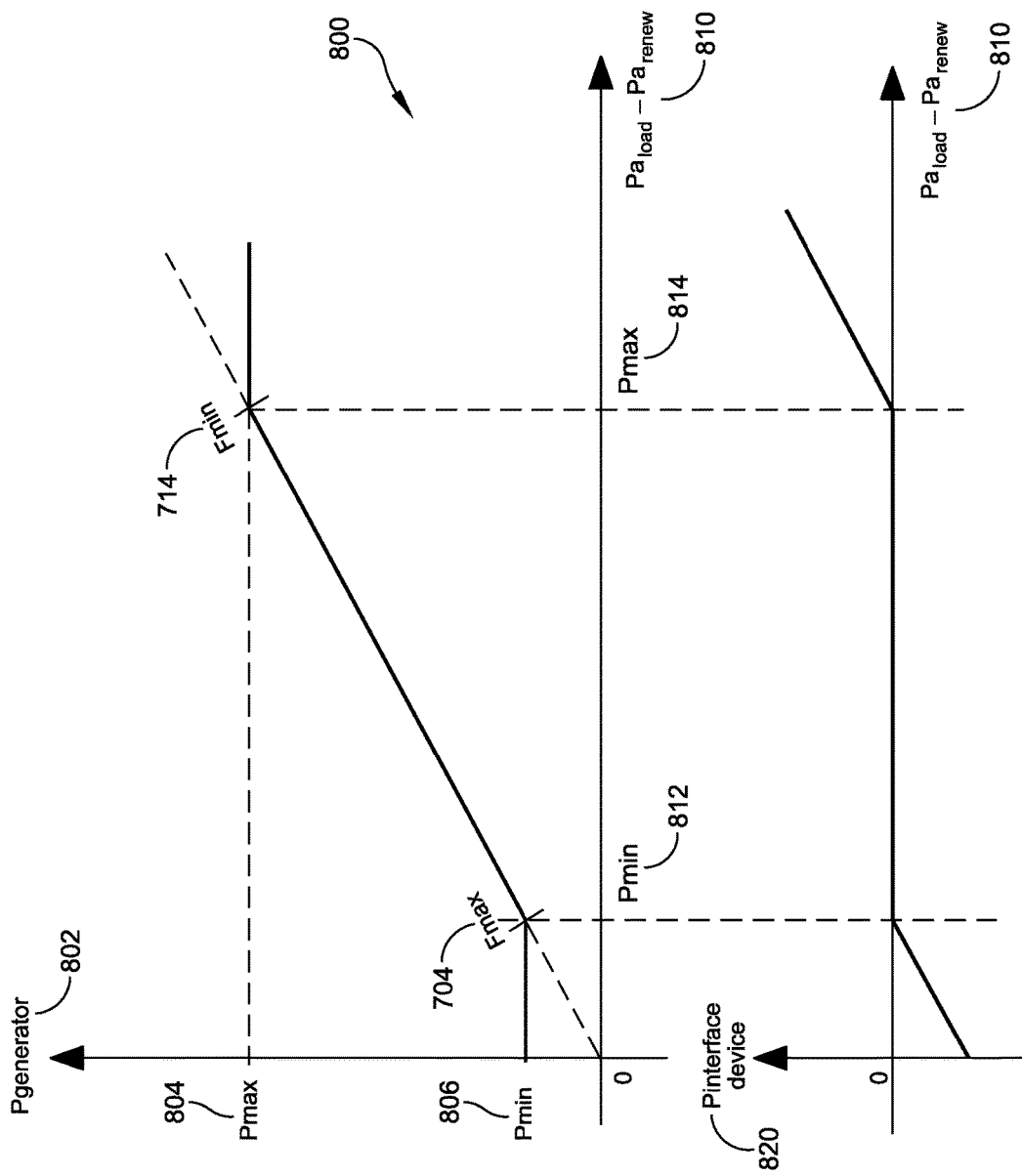
FIG. 8 is a graph depicting generator power of a portion of the microgrid in accordance with an embodiment.

FIG. 8 is a graph 800 showing an example function of output power from the power interface device 350, Pinterface 820, and corresponding output power of the main generator 510, Pgenerator 802, based on a load on the main generator 510, for example, measured by [$Pa_{load}$−$Pa_{renew}$] 810. As [$Pa_{load}$−$Pa_{renew}$] 810 goes from 0 to Pmin 812, Pinterface 820 provides negative active power so that Pgenerator 802 does not drop below a threshold value Pmin 806. When [$Pa_{load}$−$Pa_{renew}$] 810 is between Pmin 812 and Pmax 814 (which can correspond to a [$Pa_{load}$−$Pa_{renew}$] value that relates to a maximum rated output of the main generator 510), the load on the main generator 510 can be within a rated operating range. The main generator 510 can then provide the power needed to support the load 512 in addition to the power received from the renewable energy sources 502. Pinterface 820 can be zero in this range. When [$Pa_{load}$−$Pa_{renew}$] 810 is greater than Pmax 814, Pinterface 820 can provide a positive active power so that Pgenerator 802 does not go above a threshold value Pmax 804. Pmax 804 can be set so that the main generator 510 remains below the maximum rated output and does not operate in overload.

Figure 9:
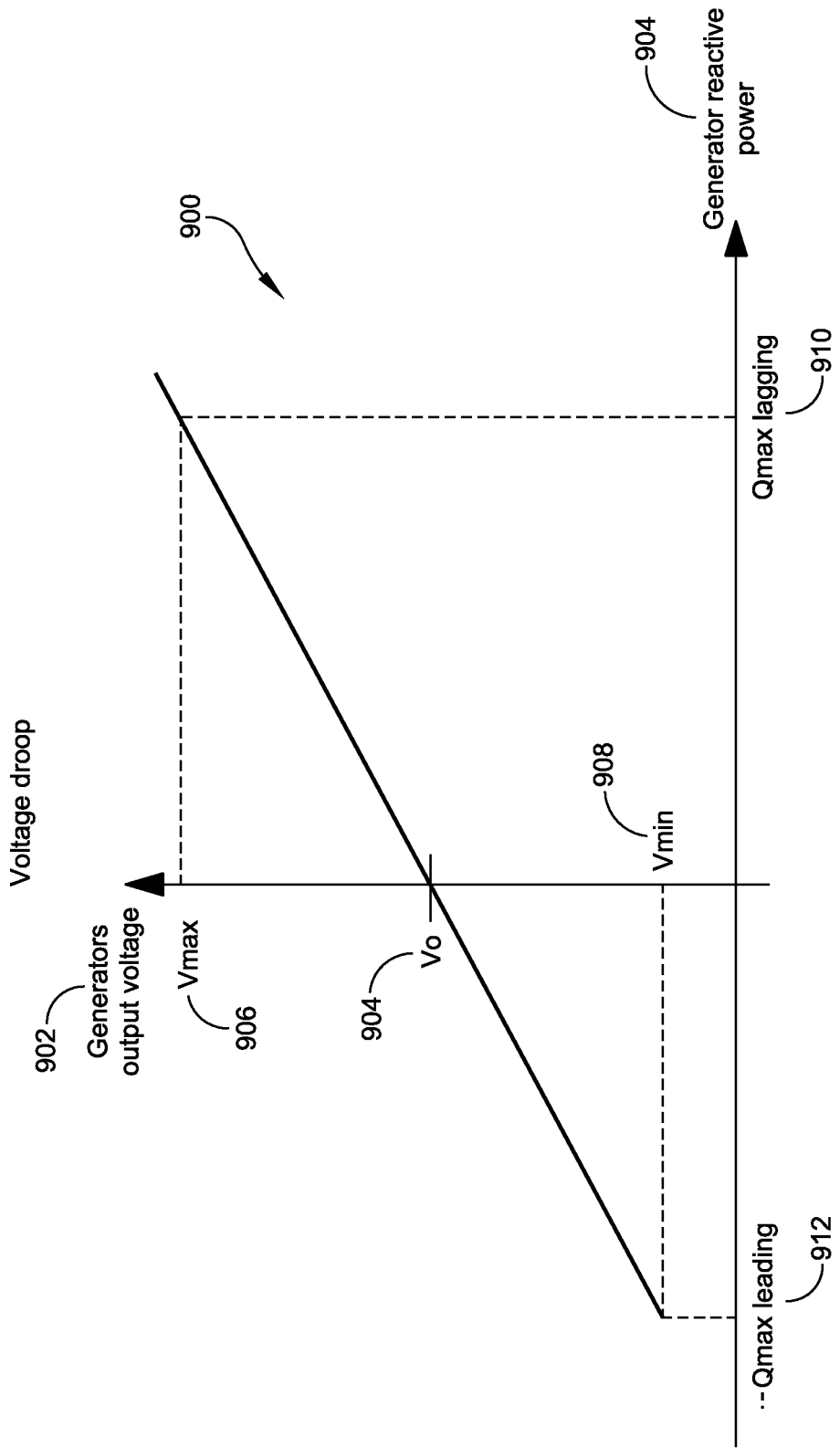
FIG. 9 is a graph depicting voltage droop of a portion of the microgrid in accordance with an embodiment.

In some embodiments, the power interface device 350 can also compensate the reactive power of the microgrid and/or the main generator. FIG. 9 shows a graph 900 of an example correlation of output voltage 902 of the main generator 510 and reactive power 904 of the main generator 510. As the main generator 510 operates in a droop mode, the output voltage 902 can vary with the reactive power 904. At a specified voltage V0 905, the main generator 510 is operating with no reactive power. As reactive power 904 increases, the output voltage 902 of the main generator 510 also increases until it reaches a maximum voltage Vmax 906 corresponding to a maximum lagging Qmax 910. As reactive power 904 decreases, the output voltage 902 also decreases until it reaches a minimum voltage Vmin 908 corresponding to a maximum leading −Qmax 912. The control algorithm can work to substantially maintain the output voltage 902 at V0 905.

Figure 10:
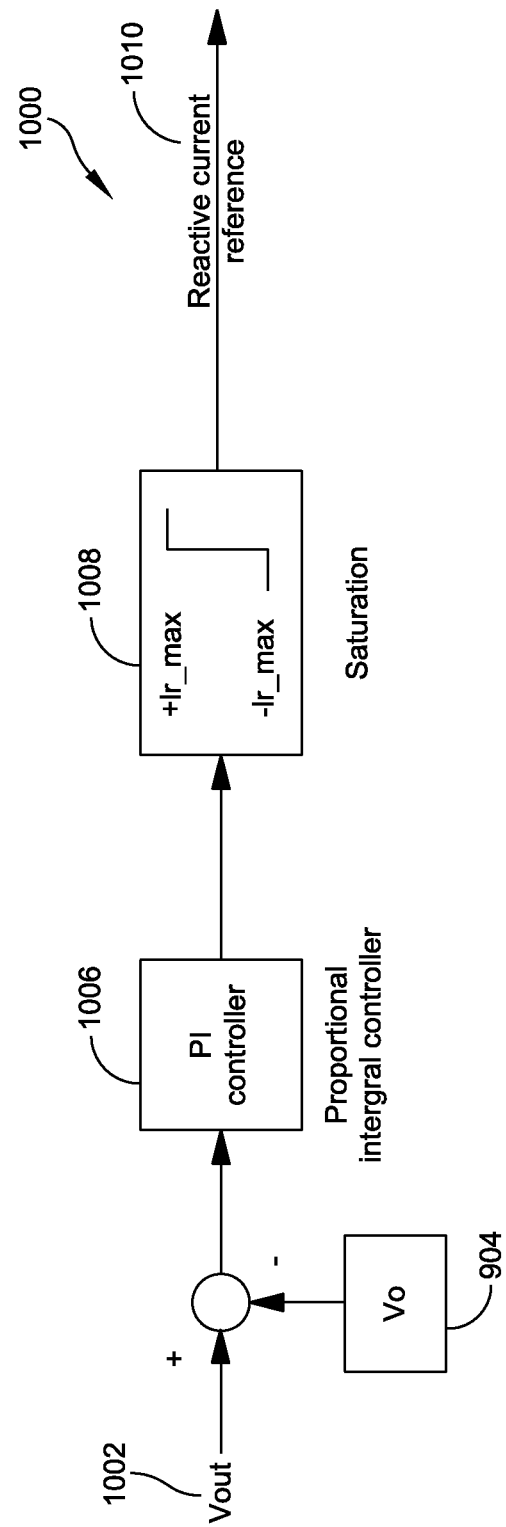
FIG. 10 is a block diagram depicting an example control algorithm in accordance with an embodiment.

For example, FIG. 10 shows a block diagram of an example algorithm 1000 to calculate a reactive current reference of the power interface device 350. The controller 352 can receive the voltage of the microgrid on an output terminal of the power interface device 350, which corresponds to the output voltage of the main generator 510 Vout 902 and subtract the specified voltage V0 905 corresponding to operation of the main generator 510 with no reactive power. The result can be provided to a proportional integral controller 1006, followed by a saturation block 1008. The saturation block 1008 can limit the output to be between a positive or negative reference current, such as +/−Ir_max, which can be a maximum allowed reactive current on the power interface output. The output reference current from the saturation block 1008 can be provided as an output reactive current reference 1010 to maintain the voltage of the microgrid at V0 905 and the main generator 510 operating with no reactive power. In this way, the power interface device 350 can compensate the reactive power of the loads 512 on the microgrid 500.

In some embodiments, the algorithms described above allow the power interface device 350 to operate without communicating with a controller of the microgrid 500.

In some embodiments, the power interface device 350 can include and/or be coupled to a load current sensor. The load current sensor can detect harmonics generated by components on the microgrid 500. The power interface device 350 can include algorithms to filter and compensate to reduce detected harmonics.

In some embodiments, the power interface device 350 can shut down, stop, or put in a standby mode components of the power interface device 350. For example, if the active current reference is zero and the power interface device 350 does not need to provide active power, the power interface device 350 can stop the inverter 354 and the power factor correction circuit 358 of the power interface device 350. The power interface device 350 can also stop compensating for reactive power.

Having now described some illustrative embodiments, it is apparent that the foregoing is illustrative and not limiting, having been presented by way of example. In particular, although many of the examples presented herein involve specific combinations of method acts or system elements, it is understood that those acts and those elements may be combined in other ways to accomplish the same objectives. Acts, elements and features discussed only in connection with one embodiment are not intended to be excluded from a similar role in other embodiments.

Note that in FIGS. 1 through 10, the enumerated items are shown as individual elements. In actual implementations of the systems and methods described herein, however, they may be inseparable components of other electronic devices such as a digital computer. Thus, actions described above may be implemented at least in part in software that may be embodied in an article of manufacture that includes a program storage medium. The program storage medium includes non-transitory and other data signals embodied in one or more of a carrier wave, a computer disk (magnetic, or optical (e.g., CD or DVD, or both)), non-volatile memory, tape, a system memory, and a computer hard drive.

Any references to front and back, left and right, top and bottom, or upper and lower and the like are intended for convenience of description, not to limit the present systems and methods or their components to any one positional or spatial orientation.

Any references to embodiments or elements or acts of the systems and methods herein referred to in the singular may also embrace embodiments including a plurality of these elements, and any references in plural to any embodiment or element or act herein may also embrace embodiments including only a single element. References in the singular or plural form are not intended to limit the presently disclosed systems or to methods, their components, acts, or elements to single or plural configurations. References to any act or element being based on any information, act or element may include embodiments where the act or element is based at least in part on any information, act, or element.

Any embodiment disclosed herein may be combined with any other embodiment, and references to "an embodiment," "some embodiments," "an alternate embodiment," "various embodiments," "one embodiment" or the like are not necessarily mutually exclusive and are intended to indicate that a particular feature, structure, or characteristic described in connection with the embodiment may be included in at least one embodiment. Such terms as used herein are not necessarily all referring to the same embodiment. Any embodiment may be combined with any other embodiment in any manner consistent with the aspects and embodiments disclosed herein.

References to "or" may be construed as inclusive so that any terms described using "or" may indicate any of a single, more than one, and all of the described terms. Intervening embodiments, acts, or elements are not essential unless recited as such. Any solution to a problem, or any element or act presented herein in the alternative, for example using the word "or," is neither ambiguous nor indirect simply because it may be presented in the alternative. Any such alternative embodiments, solutions, elements, or acts are derivable directly and unambiguously as at least one embodiment independent of any other alternative solutions, elements, or acts.

Where technical features in the drawings, detailed description or any claim are followed by reference signs, the reference signs have been included for the sole purpose of increasing the intelligibility of the drawings, detailed description, and claims. Accordingly, neither the reference signs nor their absence have any limiting effect on the scope of any claim elements.

One skilled in the art will realize the systems and methods described herein may be embodied in other specific forms without departing from the characteristics thereof. For example, the uninterruptible power supply can be a single phase or three phase uninterruptible power supply. Further, couplings between uninterruptible power supply components include direct couplings and indirect couplings where intervening elements may be present. The controller can include combinations of hardware, software, and firmware, as well as application specific integrated circuits, programmable logic devices, and processors. Input power can be provided by the AC power source, or any second or backup power source, and combinations thereof. Embodiments described with input power from any of these sources may encompass variations thereof where power is provided at least in part from another of these sources. The inverter can have different topologies, and can include two-level and three-level inverters and other topologies or multilevel topologies including four level topologies. The foregoing embodiments are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A power interface device comprising:
   a first power interface configured to couple to an electric utility;
   a second power interface configured to couple to a microgrid comprising one or more power sources and one or more loads, the one or more power sources including a generator;
   a power conversion circuit coupled to the first power interface and the second power interface; and
   a controller coupled to the power conversion circuit, the controller configured to allow interfacing between the electric utility operating at a first frequency and voltage and the microgrid operating at a second frequency and voltage by at least:
      detecting an operating frequency of the generator; and
      controlling a power flow between the electric utility and the microgrid based on the operating frequency of the generator,
         wherein controlling the power flow includes at least one of:
            receiving, at the first power interface, first power at the first frequency and voltage, converting the first power to second power at the second frequency and voltage, and providing, at the second power interface, the second power to the microgrid; and
            receiving, at the second power interface, third power at the second frequency and voltage, converting the third power to fourth power at the first frequency and voltage, and providing, at the first power interface, the fourth power to the utility grid.

2. The power interface device of claim 1, wherein the controller is configured to provide power from the electric utility to the microgrid.

3. The power interface device of claim 2, wherein the controller is configured to provide power from the electric utility to the microgrid in response to an amount of power demanded by the one or more loads in excess of an amount of power generated by the one or more power sources.

4. The power interface device of claim 1, wherein the controller is configured to provide power from the microgrid to the electric utility.

5. The power interface device of claim 4, wherein the controller is configured to provide power from the microgrid to the electric utility in response to an amount of power generated by the one or more power sources and unused by the one or more loads.

6. The power interface device of claim 1, wherein the controller is further configured to determine a reactive current reference to compensate for reactive power generated by the one or more loads.

7. The power interface device of claim 1, wherein the controller is configured to control the power flow between the electric utility and the microgrid independent of instructions from other controllers.

8. The power interface device of claim 1, wherein the power interface device is an uninterruptible power supply.

9. The power interface device of claim 8, further comprising a battery, and wherein the controller is further configured to control a second power flow between the battery and the microgrid.

10. A method of distributing power using a power interface device comprising a first power interface configured to be coupled to an electric utility, a second power interface configured to be coupled to a microgrid comprising one or more power sources and one or more loads, the one or more power sources including a generator, and a power conversion circuit, the method comprising:
   detecting an operating frequency of the generator; and
   controlling a power flow between the electric utility and the microgrid based on the operating frequency of the generator, the controlling including at least one of:
      receiving, at the first power interface, first power at a first frequency and voltage, converting the first power to second power at a second frequency and voltage, and providing, at the second power interface, the second power to the microgrid; and
      receiving, at the second power interface, third power at the second frequency and voltage, converting the third power to fourth power at the first frequency and voltage, and providing, at the first power interface, the fourth power to the utility grid.

11. The method of claim 10, wherein the controlling the power flow comprises providing power from the electric utility to the microgrid.

12. The method of claim 11, wherein the controlling the power flow comprises providing power from the electric utility to the microgrid in response to an amount of power demanded by the one or more loads in excess of an amount of power generated by the one or more power sources.

13. The method of claim 10, wherein the controlling the power flow comprises providing power from the microgrid to the electric utility.

14. The method of claim 13, wherein the controlling the power flow comprises providing power from the microgrid to the electric utility in response to an amount of power generated by the one or more power sources and unused by the one or more loads.

15. The method of claim 10, further comprising determining a reactive current reference to compensate for reactive power generated by the one or more loads.

16. The method of claim 10, comprising controlling the power flow between the electric utility and the microgrid independent of instructions from other controllers.

17. The method of claim 10, wherein the power interface device is an uninterruptible power supply.

18. The method of claim 17, wherein the uninterruptible power supply further comprises a battery, and wherein the method further comprises controlling a second power flow between the battery and the microgrid.

19. A power interface device comprising:
   a first power interface configured to couple to an electric utility;
   a second power interface configured to couple to a microgrid comprising one or more power sources and one or more loads, the one or more power sources including a generator;
   a power conversion circuit coupled to the first power interface and the second power interface; and
   means for detecting an operating frequency of the generator and controlling a power flow between the electric utility and the microgrid based on the operating frequency of the generator, the controlling including:
      receiving, at the first power interface, first power at the first frequency and voltage, converting the first power to second power at the second frequency and voltage, and providing, at the second power interface, the second power to the microgrid; and
      receiving, at the second power interface, third power at the second frequency and voltage, converting the third power to fourth power at the first frequency and voltage, and providing, at the first power interface, the fourth power to the utility grid.

* * * * *

UNITED STATES PATENT AND TRADEMARK OFFICE
CERTIFICATE OF CORRECTION

PATENT NO. : 10,505,367 B2
APPLICATION NO. : 14/913066
DATED : December 10, 2019
INVENTOR(S) : Patrick Chambon It is certified that error appears in the above-identified patent and that said Letters Patent is hereby corrected as shown below:

In the Specification

Column 7, Line 12, delete "Road" and insert --Fload--;

Column 7, Line 45, delete "Road" and insert --Fload--;

Column 7, Line 48, delete "Road" and insert --Fload--.

Signed and Sealed this
Tenth Day of March, 2020

Andrei Iancu
*Director of the United States Patent and Trademark Office*